(12) United States Patent
Soreide et al.

(10) Patent No.: US 7,215,413 B2
(45) Date of Patent: May 8, 2007

(54) CHIRPED SYNTHETIC WAVE LASER RADAR APPARATUS AND METHODS

(75) Inventors: David C. Soreide, Seattle, WA (US); David A. Leep, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/165,941

(22) Filed: Jun. 24, 2005

(65) Prior Publication Data

US 2006/0290917 A1    Dec. 28, 2006

(51) Int. Cl.
*G01C 3/08*    (2006.01)
(52) U.S. Cl. .................. 356/5.11; 356/5.1; 356/5.01
(58) Field of Classification Search ............. 356/5.11
See application file for complete search history.

(56) References Cited

U.S. PATENT DOCUMENTS

| | | | |
|---|---|---|---|
| 4,492,464 A | 1/1985 | Bourdet et al. | |
| 4,552,457 A | 11/1985 | Giallorenzi et al. | |
| 4,611,915 A | 9/1986 | Gillard et al. | |
| 4,818,100 A * | 4/1989 | Breen | 356/5.06 |
| 4,830,486 A * | 5/1989 | Goodwin | 356/4.09 |
| 4,886,363 A | 12/1989 | Jungquist | |
| 4,907,886 A | 3/1990 | Dandliker | |
| 5,054,912 A | 10/1991 | Kuchel | |
| 5,106,191 A | 4/1992 | Ohtsuka | |
| 5,106,192 A | 4/1992 | Tucker et al. | |
| 5,141,319 A | 8/1992 | Kajimura et al. | |
| 5,153,669 A | 10/1992 | DeGroot | |
| 5,371,587 A * | 12/1994 | de Groot et al. | 356/486 |
| 6,563,454 B2 * | 5/2003 | Akasu | 342/130 |
| 6,624,783 B1 * | 9/2003 | Rabideau | 342/195 |

FOREIGN PATENT DOCUMENTS

DE    10224761    3/2004

OTHER PUBLICATIONS

European Search Report, Application No. EP 06 01 2914, dated Oct. 9, 2006, 7 pages.

* cited by examiner

*Primary Examiner*—Thomas H. Tarcza
*Assistant Examiner*—Luke D. Ratcliffe
(74) *Attorney, Agent, or Firm*—Lee & Hayes, PLLC (57) ABSTRACT

Chirped synthetic wave laser radar apparatus and methods are disclosed. In one embodiment, a system includes a laser source, a controller operatively coupled to the laser source and adapted to frequency-modulate first and second laser outputs, and an optical assembly. The optical assembly includes a plurality of reference channels adapted to receive a portion of a combined laser output and to provide a reference interference signal, and a signal channel having a focusing telescope adapted to focus and transmit at least part of the combined laser output onto the target, and to receive a scattered signal from target, and to provide a return interference signal. The system further includes a signal processing portion adapted to receive the reference interference signals and the return interference signal and to determine the distance to the target based on the reference and return interference signals.

25 Claims, 6 Drawing Sheets

FIG. 6

CHIRPED SYNTHETIC WAVE LASER RADAR APPARATUS AND METHODS

CROSS REFERENCE TO RELATED APPLICATIONS

This patent application is related to co-pending, commonly-owned U.S. patent application Ser. No. 11/014,919 entitled "Ultra-Linear Signal Processing for Radar and Laser Radar", filed on Dec. 17, 2004, and U.S. patent application Ser. No. 11/016,623 entitled "Method and Apparatus for Combining a Targetless Optical Measurement Function and Optical Projection of Information", filed Dec. 17, 2004, which applications are incorporated herein by reference.

FIELD OF THE INVENTION

This invention relates to radar systems, and more specifically, to chirped synthetic wave laser radar apparatus and methods used, for example, for manufacturing large scale objects.

BACKGROUND OF THE INVENTION

Radio detection and ranging (radar) may be used to detect, range, and map a wide variety of objects. For example, a weather radar system on an airplane can detect and range rain or other weather events, and a military fire control radar system can detect and track a military target, such as a ship or an aircraft.

Radar can also be used to range and map objects for manufacturing purposes. For example, laser radar is particularly well-suited for manufacturing large-scale objects (such as aircraft) because laser radar allows precise measurement over a large volume. In one approach, referred to as a chirped or Frequency Modulated-Continuous Wave (FMCW) radar, the radar frequency is modulated, as disclosed, for example, in U.S. Pat. No. 4,594,000 issued to Falk et al., incorporated herein by reference. Another approach, as disclosed in U.S. Pat. No. 5,371,587 issued to de Groot et al., uses a Chirped Synthetic Wavelength (CSW) method in combination with FMCW.

In a chirped radar, there is a time delay between the time when the signal is sent to an object and the time when the radiation scattered from the object is collected. As a result, there is a frequency difference between the radiation that is transmitted and the radiation that is collected. If these two signals with different frequencies are mixed, a beat frequency is observed. If the chirp is linear, then the beat frequency is proportional to the time delay and, therefore, to the range to the scattering object. If the chirp is not linear, then measuring range with a chirped radar entails measuring a sinusoidal signal that is varying in frequency (or, equivalently, in phase) in an environment of random noise.

Although desirable results have been achieved using prior art chirped radar systems, there is room for improvement. For example, prior art chirped radar systems, including those radar systems disclosed in the above-referenced patent issued to de Groot et al., typically include complex optical systems. These complex optical systems may adversely impact the cost and reliability of such prior art systems.

SUMMARY OF THE INVENTION

The present invention is directed to chirped synthetic wave laser radar apparatus and methods. Embodiments of apparatus and methods in accordance with the present invention may advantageously simplify the optical system of such radar systems, and may thereby reduce cost and improve reliability in comparison with prior art systems.

In one embodiment, a system for determining a distance to a target includes a laser source adapted to provide a first laser output and a second laser output, a controller operatively coupled to the laser source and adapted to frequency-modulate the first and second laser outputs, and an optical assembly adapted to receive and combine at least part of the first and second laser outputs into a combined laser output. The optical assembly includes a plurality of reference channels adapted to receive a portion of the combined laser output and to provide a reference interference signal, and a signal channel having a focusing telescope adapted to focus and transmit at least part of the combined laser output onto the target, and to receive a scattered signal from target, and to provide a return interference signal. The system further includes a signal processing portion adapted to receive the reference interference signals and the return interference signal and to determine the distance to the target based on the reference and return interference signals.

BRIEF DESCRIPTION OF THE DRAWINGS

Embodiments of the present invention are described in detail below with reference to the following drawings.

DETAILED DESCRIPTION

The present invention relates to chirped synthetic wave laser radar apparatus and methods. Many specific details of certain embodiments of the invention are set forth in the following description and in FIGS. 1–6 to provide a thorough understanding of such embodiments. The present invention may have additional embodiments, or may be practiced without one or more of the details described for any particular described embodiment.

In general, embodiments of the present invention may advantageously reduce the optical complexity of laser radar apparatus in comparison with the prior art. More specifically, embodiments of the present invention may eliminate certain components typically present in prior art chirped synthetic wave laser radar apparatus. Thus, by reducing the complexity of the optical system within the laser radar apparatus, embodiments of the present invention may provide improved reliability and reduced cost in comparison with prior art systems.

More specifically, embodiments of the present invention may combine aspects of chirped laser radar systems with synthetic wave distance measurements to provide highly accurate distance measurement. Chirped laser radar measurements may exhibit limited resolution for practical lasers, but provide an absolute measurement. On the other hand, synthetic wavelength methods generally provide improved resolution (depending on the chosen synthetic wavelength), but the result is ambiguous because the integer number of synthetic wavelengths must be known to have an absolute distance measurement. Embodiments of the present invention advantageously combine aspects of both chirped laser radar systems and synthetic wavelength distance measurements to achieve improved distance measurement performance over the prior art.

Figure 1:
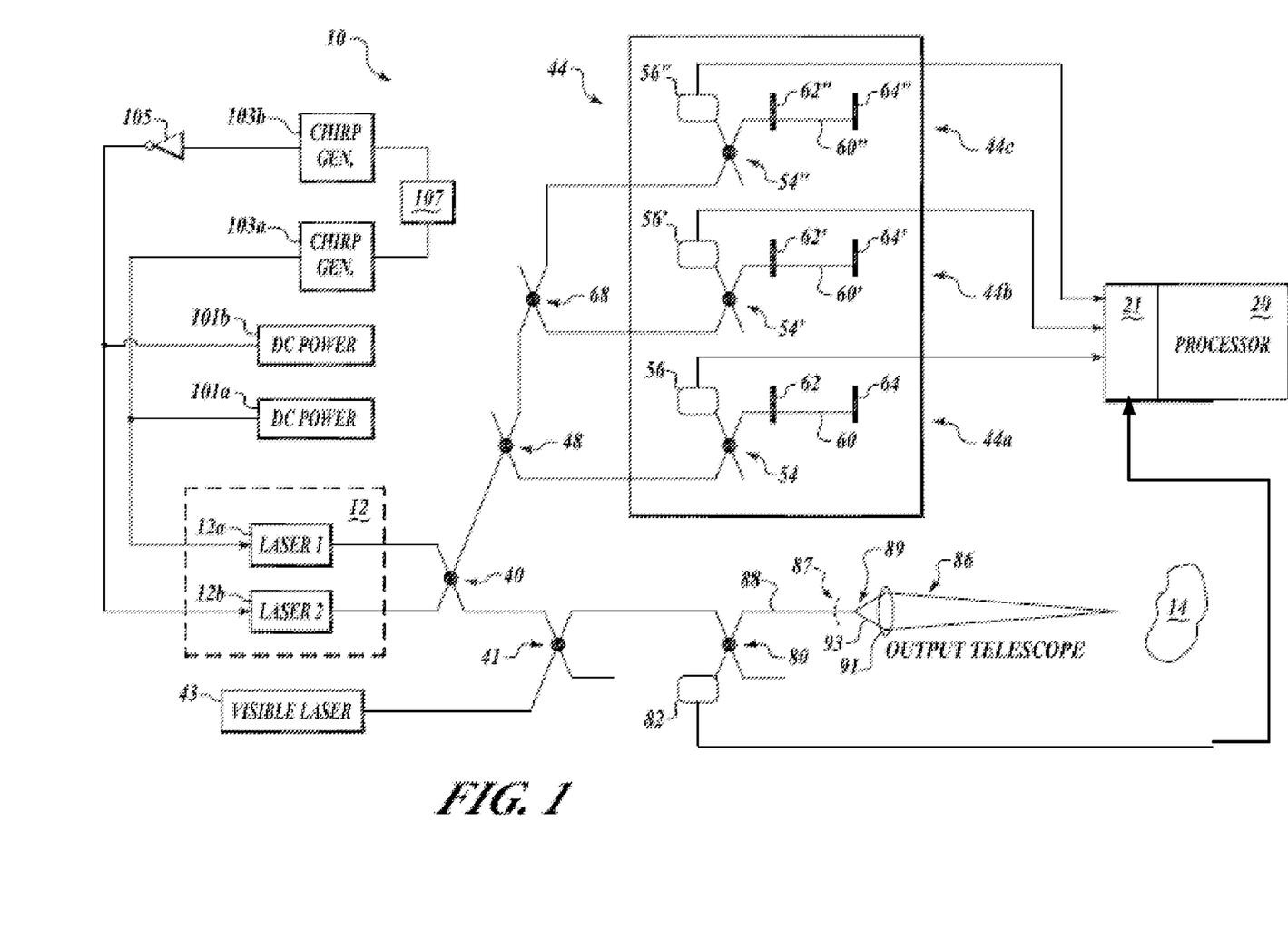
FIG. 1 is a block diagram of a system for determining range to a target in accordance with an embodiment of the invention.

FIG. 1 shows a chirped synthetic wave laser radar system 10 in accordance with an embodiment of the invention. The radar system 10 includes a two-frequency laser source 12, and a reference interferometer 44 including reference channels 44a, 44b, and 44c. In one particular embodiment, the system 10 has a maximum operating range of approximately 4 meters with a range resolution of approximately 0.02 mm. Another particular embodiment has a maximum operating range of approximately 8 meters with a range resolution of approximately 0.02 mm. In alternate embodiments, however, the system 10 may have other maximum operating ranges and range resolutions as desired for a particular application. Furthermore, the laser source 12 may include more than two lasers and the reference interferometer 44 may include more than three reference channels, if desired.

The system 10 is adapted to measure distance to a target 14, including a non-cooperative target, that is, a target that does not include retro-reflectors or fiducials. With continued reference to FIG. 1, the laser source 12 includes a first laser source 12a and a second laser source 12b. DC power sources 101a and 101b provide a DC bias current to the lasers 12a and 12b that operate at wavelengths that are different from each other. Given by way of nonlimiting example, the laser sources 12a and 12b may include distributed feedback (DFB) laser diodes. The laser sources 12a and 12b may have relatively high output power. Suitable embodiments of laser sources include, for example, model CQF-935/708 diodes commercially-available from JDS Uniphase Corporation of San Jose, Calif., and model TLB-6000 diodes commercially-available from New Focus, Inc. of San Jose, Calif. In further embodiments, the laser sources 12a, 12b may include external cavity laser diodes, fiber lasers, and any other suitable laser source.

Given by way of non-limiting example, the first laser source 12a suitably has a wavelength $\lambda_1$ of approximately 1550 nanometers (nm) and the second laser source 12b suitably has a wavelength $\lambda_2$ of approximately 1550.6 nm. The wavelengths $\lambda_1$ and $\lambda_2$ correspond to frequencies that differ from each other by around 100 GHz or so. While any wavelength may be selected as desired for a particular application, it is important that the wavelengths $\lambda_1$ and $\lambda_2$ be different from each other. This difference in wavelengths enables generation of an interference pattern that will be processed to determine range to the target 14, as will be discussed below.

The first and second laser sources 12a and 12b are frequency-modulated by chirp generators 103a and 103b, respectively. The chirp generators 103a and 103b may suitably provide a triangle-wave modulation to the bias currents that drive the laser sources 12a, 12b. The lasers respond to the varying drive current by shifting in operating frequency. When the laser sources 12a, 12b are DFB lasers, modulation frequency of the triangle wave may be limited to approximately 3000 Hz. If external cavity lasers are used, the modulation frequency may be slower. An exemplary modulation frequency used with external cavity lasers is approximately 100 Hz. Output of the chirp generator 103b is supplied to an inverting amplifier 105, which inverts and amplifies (e.g. by a factor of approximately 2) the triangle wave modulation. It will be appreciated that the inverted and amplified output from the inverting amplifier 105 advantageously causes the two beat frequencies from the two laser sources 12a, 12b to be far enough apart in a Fourier transform portion of the signal processing (described below) that they can be separated, allowing the frequencies and phases to be measured separately.

Output of the inverting amplifier 105 in turn is provided to the second laser source 12b. A modulation current, such as a triangle wave from the chirp generator 103a and an inverted triangle wave from the inverting amplifier 105, is added to the DC bias supplied by the DC power sources 101a and 101b, respectively. A trigger 107 ensures simultaneous operation of the chirp generators 103a and 103b. Because the frequencies of the laser sources 12a and 12b are modulated, the laser source 12 may be considered a chirped laser and, accordingly, the system 10 may be considered a chirped laser radar.

The beams from the laser sources 12a and 12b are sent through an optical fiber and are combined in a first splitter 40. In this embodiment, the combined beam is sent from the first splitter 40 through an optical fiber to a second splitter 41, where the combined beam is further combined with the output of a visible laser 43. As shown in FIG. 1, in some embodiments, it may be desirable to include the output of the visible laser 43 so that the laser beam that is propagated to the target 14 is visible, such as may be desirable, for example, for persons working in a manufacturing environment. Alternately, the visible laser 43 (and the second splitter 41) may be eliminated.

As further shown in FIG. 1, the combined beam is sent from the second splitter 41 through an optical fiber to a third splitter 80, which further splits the combined beam and routes a portion of the combined beam through an optical fiber 88. As representatively shown in FIG. 1, a reflected portion 87 of the combined beam is reflected as a natural Fresnel reflection from a flat polished end 89 of the optical fiber 88, and passes back along the optical fiber 88. The end 89 of the optical fiber 88 may be intentionally adapted to provide the reflected portion 87 (e.g. as a local oscillator). Unless otherwise specified, various other fiber ends throughout the system 10 may be adapted to provide approximately no reflections to avoid undesirable noise and interfering signals.

As further shown in FIG. 1, a non-reflected portion exits from the optical fiber 88 and is focused and transmitted by an output telescope 86 to the target 14. More specifically, in one particular embodiment, the output telescope 86 includes an objective lens 91 that receives an expanding beam 93 exiting from the end 89 of the fiber 88, thereby eliminating the need for a diverging lens in the output telescope 86. In alternate embodiments, however, the output telescope 86 may have both diverging and objective lenses. The output telescope 86 may also be adapted to provide approximately no reflections that might otherwise produce undesirable noise and interfering signals. An interference between the reflected portion 87 and the light scattered back to the system 10 by the target 14 is analyzed to determine the distance to the target 14.

A photo detector 82 is also optically coupled to the third splitter 80. Output of the photo detector 82 is provided to an input interface 21 of a processor 20, where the output of the photo detector 82 may undergo an analog-to-digital conversion (ADC) and may be further processed as discussed below. The processor 20 may be any suitable signal processor, including, for example, a digital signal processor such as an Alacron Digital Signal Processor, a field programmable gate array (FPGA) with operations at up to around 3,000 points per second, and any other suitable processor or processing device.

The reflected portion 87 of the combined beam that reflects from the output telescope 86 back through the optical fiber 88 may be approximately four percent of the portion of the combined beam that reaches the output telescope 86. Also, a return signal from the target 14 enters the optical fiber 88 via the output telescope 86. The return signal from the target 14 and the natural, Fresnel reflection from the output telescope 86 combine to form an interference signal. The interference signal is sent through the optical fiber to the third splitter 80 and is detected by the photo detector 82. The detected interference signal is then provided by the photo detector 82 to the processor 20 for processing as described below.

As mentioned above, the reference interferometer 44 includes reference channels 44a, 44b, and 44c, each reference channel including optical fibers of a known length. As will be discussed below, determining and comparing frequency of signals from the reference channels 44a, 44b, and 44c with frequency of the interference signal advantageously enables embodiments of the present invention to determine range to the target 14.

As further shown in FIG. 1, the first splitter 40 provides via an optical fiber a portion of the combined laser beams to a fourth splitter 48 that, in turn, provides the portion of the combined laser beams to the reference interferometer 44. More specifically, a portion of the combined laser beams is supplied via an optical fiber to the reference channel 44a from the fourth splitter 48. Another portion of the combined laser beams is supplied via an optical fiber from the fourth splitter 48 to a fifth splitter 68. The fifth splitter 68, in turn, supplies portions of the combined laser beams via optical fibers to the reference channels 44b and 44c.

The reference channel 44a includes a sixth splitter 54 that receives the portion of the combined laser beams from the fourth splitter 48. An optical fiber 60 with flat, polished ends 62 and 64 is optically coupled to the sixth splitter 54 at the end 62. The optical fiber 60 has a predetermined, known length $l_1$. The length $l_1$ is selected to be approximately around one-half the expected distance to the target 14, that is, around one-half of the maximum length that is expected to be measured. For example, in one embodiment, the length $l_1$ is around 2 meters because the maximum range expected to be measured is around 4 meters.

A photo detector 56 is also optically coupled to the sixth splitter 54. Output of the photo detector 56 is provided to the input interface 21 of the processor 20. At the processor 20, the output of the photo detector 56 is sampled, undergoes an analog-to-digital conversion (ADC), and is further processed as discussed below.

The portion of the combined beams is sent from the sixth splitter 54 through the optical fiber 60. A natural, Fresnel reflection (e.g. approximately four percent) of the portion of the combined beam reflects from the end 62. The rest of the portion of the combined beam exits the end 62 and is sent through the optical fiber 60 along its length $l_1$ to the end 64. A natural, Fresnel reflection of the portion of the combined beam that has been sent to the end 64 reflects from the end 64. The natural, Fresnel reflections from the ends 62 and 64 combine to form a reference interference signal. The reference interference signal is sent to the sixth splitter 54 and is detected by the photo detector 56. The detected reference interference signal is provided by the photo detector 56 to the processor 20 for processing as described below.

The reference channels 44b and 44c are constructed in a similar manner. The reference channel 44b includes a seventh splitter 54' and photo detector 56', and an optical fiber 60' with flat, polished ends 62' and 64'. However, the optical fiber 60' has a predetermined, known length $l_2$ that is different from the length $l_1$. Likewise, the reference channel 44c includes an eighth splitter 54" and photo detector 56", and an optical fiber 60" with flat, polished ends 62" and 64". However, the optical fiber 60" has a predetermined, known length $l_3$ that is different from the lengths $l_1$ and $l_2$. The lengths $l_2$ and $l_3$ are used to compute the integral phase for the reference length $l_1$. The shorter of the lengths (computed from the difference between the lengths $l_2$ and $l_3$) is short enough such that the normal drift of the wavelength of the laser preferably causes less than one cycle change in the measured phase. In a particular embodiment, for example, the shorter of the lengths is selected to cause less than approximately one fourth of a cycle change in the measured phase. Then the longer length is chosen to provide a convenient frequency to be a substantial fraction of the length $l_1$. In one specific embodiment, for example, the difference between the lengths $l_2$ and $l_3$ may be approximately 174 mm, and the length $l_2$ may be approximately 823.5 mm.

In yet another specific embodiment, two DFB laser diodes separated by approximately 90 GHz are used to generate the output, chirping in opposite directions with slopes differing by approximately a factor of two (i.e. an amplification factor by the inverting amplifier 105 of approximately two). The light is combined in a polarization-maintaining fiber using a conventional 50:50 splitter, and then split into four parts with more 50:50 splitters. A fiber length of a first one of the reference channels may be approximately 0.5 meters long, and a fiber length of a second one of the reference channels may differ from the fiber length of the first one of the reference channels by approximately 2 cm. A fiber length of a third one of the reference channels may be approximately 5 meters in length. In this embodiment, the reference interferometer provides a sequence of references composed of the difference between the fiber lengths of the first and second reference channels (i.e. approximately 2 cm), the fiber length of either the first or second reference channels (i.e. approximately 0.5 meters), and the fiber length of the third reference channel (i.e. approximately 5 meters). Proper sequencing of these references ensures that the system 10 can accommodate a range of laser variations normally encountered without losing track of the integer number of cycles.

Embodiments of the radar apparatus and methods in accordance with the invention may provide significant advantages over the prior art. For example, because the output beam transmitted to the target 14 is focused by the output telescope 86 rather than collimated, the system 10 may operate properly at longer ranges in comparison with conventional chirped synthetic wave radar systems. Embodiments of the invention also have more simplified optics in comparison with conventional chirped synthetic wave radar systems. For example, in comparison with conventional systems, such as those systems disclosed in U.S. Pat. No. 5,371,587 issued to de Groot et al., there is no need for a phase modulator in the output channel, and no rectifier in the analog signal electronics. Therefore, the complexity of the optics of embodiments of the invention are simplified, and cost and reliability are improved.

Embodiments of the invention provide signal processing that determines parameters related to phase and/or frequency of sinusoidal signals in the presence of non-linearities in the frequency modulation of the source, such as laser sources of a laser radar, that may be more accurate than the prior art. According to embodiments of the invention, use of time-resolved frequency analysis permits comparing results between a known, reference length and the distance to the target 14 that is desired to be measured. Advantageously, this approach is applicable to frequency-based implementations, such as a chirped laser radar, as well as phase-based implementations, such as synthetic wave interferometry.

Signal processing routines described herein may suitably be executed by the processor 20 responsive to commands or instructions contained in a software program. The software program may be a computer software program product with executable computer software program code stored on storage media, such as without limitation a CD-ROM, a flash disk, an optical disk, a floppy disk, or the like, and loaded into random-access-memory (RAM) of the processor 20. Alternately, the software program may be burned into non-volatile memory, such as electrically-erasable programmable read-only memory (EEPROM), flash EEPROM, or the like, of the processor 20, if applicable.

Figure 2:
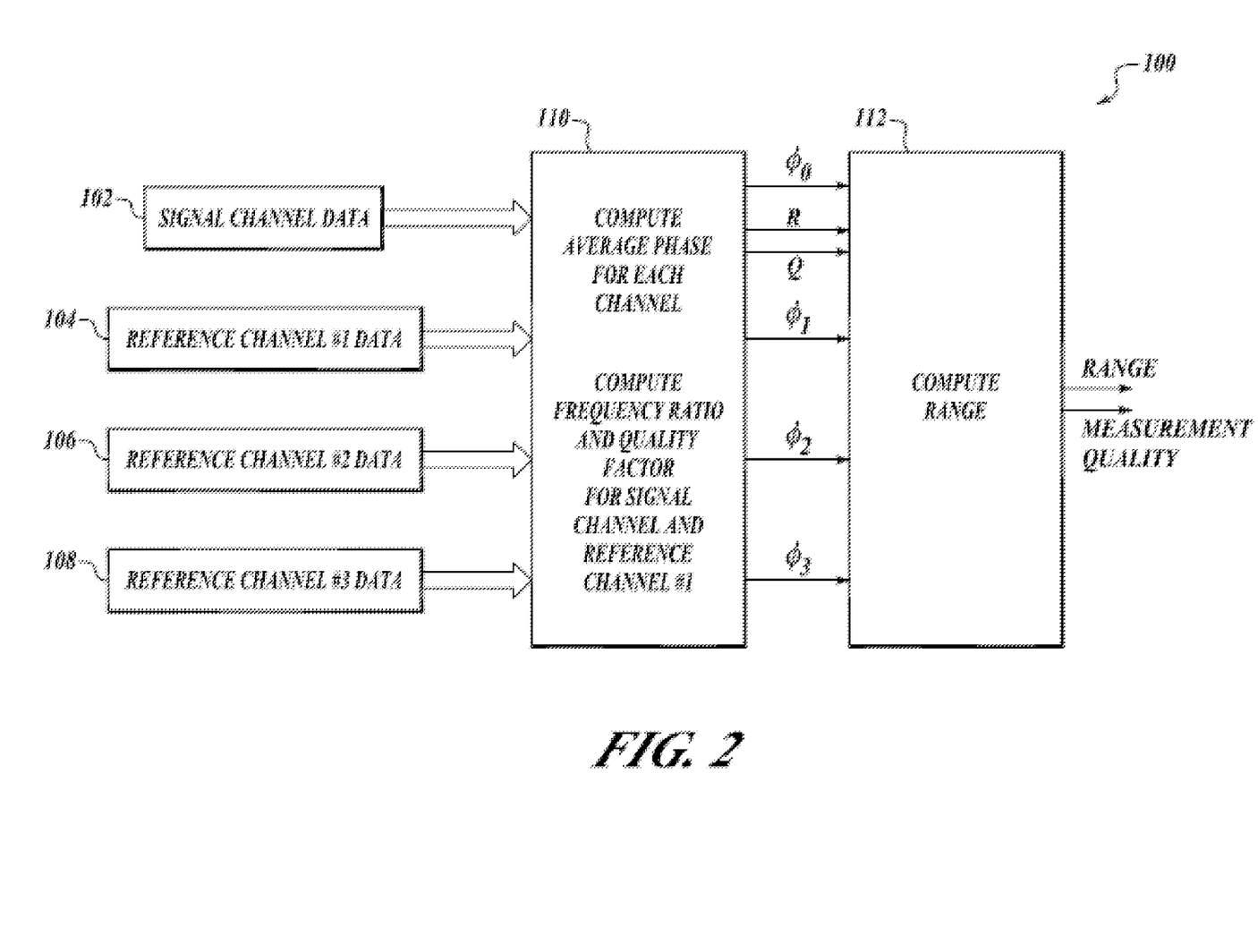
FIG. 2 is a block diagram of signal processing according to an embodiment of the present invention.

Referring now to FIG. 2 and by way of overview, an exemplary routine 100 processes signals according to an embodiment of the invention. At a block 102, signal channel data for the interference signal from the photo detector 82 (referred to herein as a "signal channel") is input. At a block 104, reference interference signal data from the reference channel 44*a* is input. Similarly, at a block 106, reference interference signal data is input from the reference channel 44*b*, and at a block 108, reference interference signal data is input from the reference channel 44*c*.

At a block 110, an average phase $Ø_0$ is computed for the interference signal from the signal channel, and average phases $Ø_1$, $Ø_2$, and $Ø_3$ are computed for the reference interference signals from the reference channels 44*a*, 44*b*, and 44*c*, respectively. At the block 110, a frequency ratio R is computed between the interference signal and the reference length $l_1$ (described above), and also a quality factor Q of the interference signal is computed, for the signal channel and the reference channel 44*a*.

Although phase and frequency may not be well-defined quantities for a time-varying single tone, the slope of a plot of phase versus time or the average phase value may be repeatable and may be sufficiently precise quantities. According to embodiments of the invention, in the case of a chirped laser radar that uses a reference length (such as the reference channels 44*a*, 44*b*, and 44*c*), comparison of the slopes or the average phases advantageously may provide a measure of distance to the target 14 that may be as accurate as if the frequency of the chirp were completely linear.

Phase may be measured as a function of time within a signal that is composed of narrow bandwidth sinusoids in random noise. A measurement indicative of frequency, referred to simply as "frequency" for sake of clarity, may be derived as the slope of the phase-versus-time function, and phase may be defined as the average phase over the measured time interval. Frequency in this case refers to the frequency term in a cosine function. Because the frequency of the signal typically varies, there is an array of frequency terms. According to embodiments of the invention, a linear fit through the phases yields a measurement indicative of frequency. Measuring this quantity that is indicative of frequency and then comparing that quantity between the signal channel and the reference channel can yield stable results. Advantageously, uncertainty in measurement of a varying signal in random noise may be reduced over conventional measurement techniques that perform a Fourier transform over the entire time interval of the signal.

As further shown in FIG. 2, at a block 112, range and measurement quality are computed from the average phases $Ø_0$, $Ø_1$, $Ø_2$, and $Ø_3$, the ratio R, and the quality factor Q. Details regarding the processing blocks will be explained below. It will be appreciated that, in the following discussion and accompanying figures, the processing of a single frequency is shown and described, while in actual operation, embodiments of the invention simultaneously process two frequencies (one from the first laser source 12*a* and another from the second laser source 12*b*). For the sake of brevity and clarity, however, in the following, the processing of a single frequency is described and shown.

Figure 3:
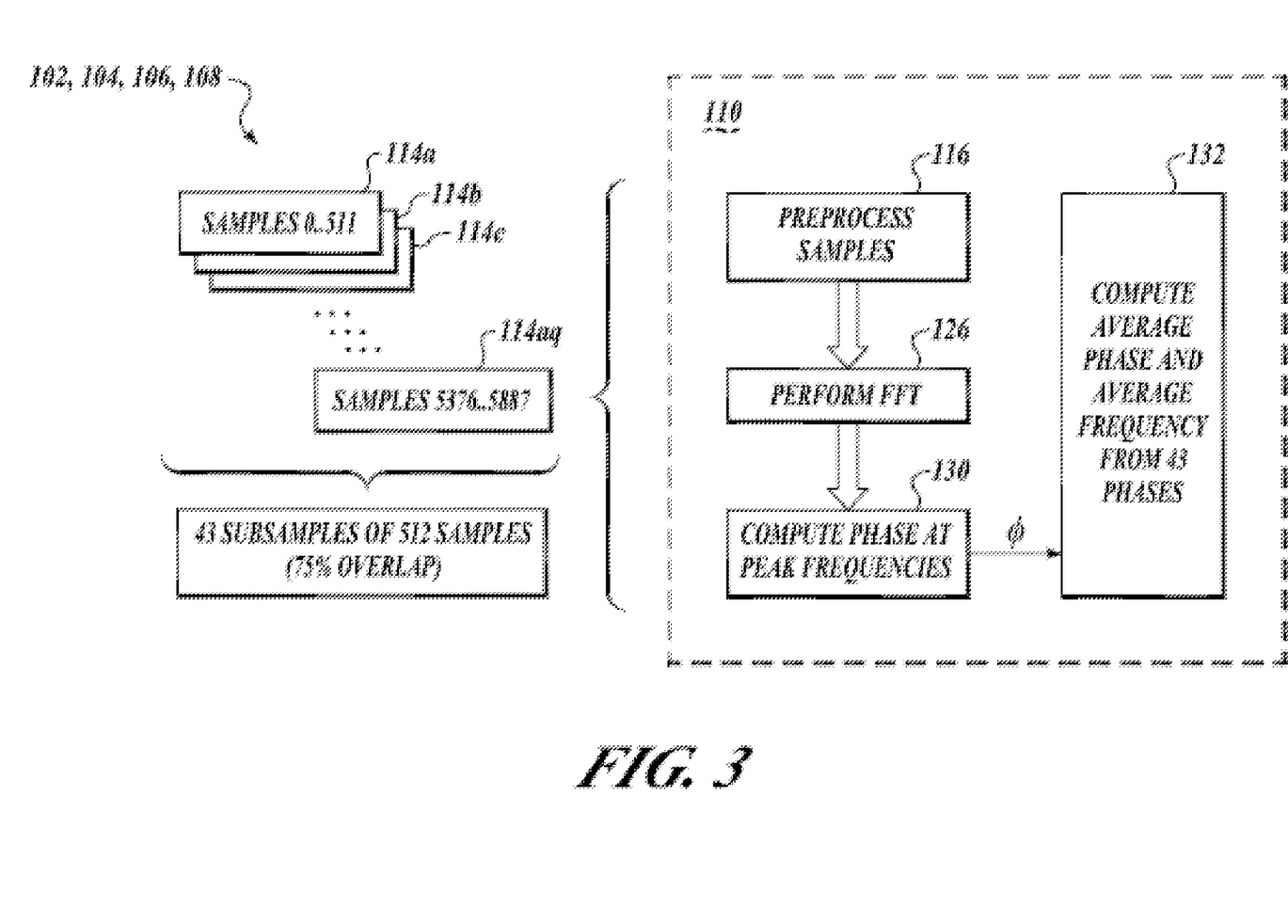
FIG. 3 is a top-level software block diagram of phase calculation according to an embodiment of the present invention.

Referring additionally to FIG. 3, at the blocks 102, 104, 106, and 108 data is sampled over one-half cycle of modulation (corresponding to a monotonic portion of the triangle wave generator's signals). Advantageously, a group of samples, referred to as a subinterval or a subsample, overlaps adjacent groups of samples (that is, adjacent subsamples). It is the subsample on which a Fourier transform is performed to extract frequency and phase. This approach presents two competing issues. First, it is desirable that the time centers of the subsamples be close together because the integral phase is estimated from the measured frequency. The shorter the time interval, the more likely that a mistake is not made (such as slipping a modulation cycle). Second, if the subsample is larger, the accuracy with which frequency and phase can be determined is better. Overlapping advantageously affords the benefits of shorter time intervals (thereby reducing probability of mistakes) as well as the benefits of longer time intervals (thereby increasing accuracy), at the cost of more computation. Use of subintervals also permits more than one sinusoid in the signal (assuming that spectral peaks are sufficiently well-separated).

In a particular, non-limiting embodiment, for example, forty-three subsamples are taken. Each subsample includes 512 sample points and has a seventy-five percent overlap of common sample points with adjacent subsamples. However, it will be appreciated that, in alternate embodiments, any number of sample points and any amount of overlap may be selected as desired for a particular application. For example, by selecting a step size of 128 points (25% of the subsample size), it follows that a subsample 114*a* includes sample points 0–511; a subsample 114*b* includes sample points 127–639; a subsample 114*c* includes sample points 255–767; and so on through a subsample 114*aq* (that is, the forty-third subsample) that includes sample points 5376–5887.

At a block 116 (FIG. 3), the sample points in the subsamples 114*a*–114*aq* are preprocessed. Referring additionally to FIGS. 4A–4D, details are set forth regarding the preprocessing performed at the block 116. A time series 118 (FIG. 4A) of a sinusoidal signal is representative of any one of the subsamples 114*a*–114*aq* (FIG. 3). The time series 118 may be the interference signal from the signal channel or any of the reference interference signals from any of the reference channels 44*a*, 44*b*, or 44*c*.

Figure 4A:
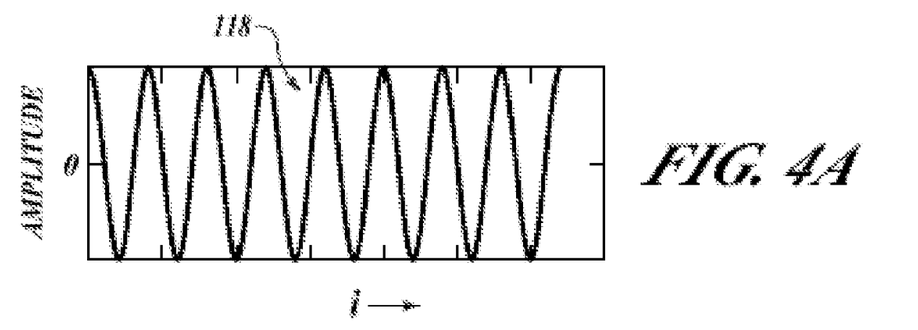
FIGS. 4A–4D are illustrations of pre-processing of samples according to an embodiment of the present invention.
Figure 4B:
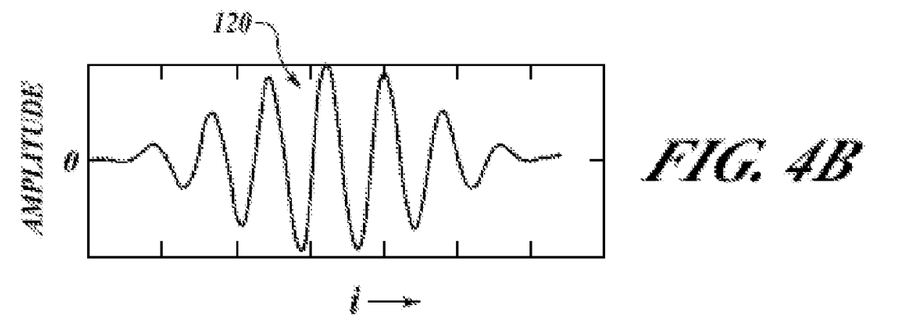
Figure 4C:
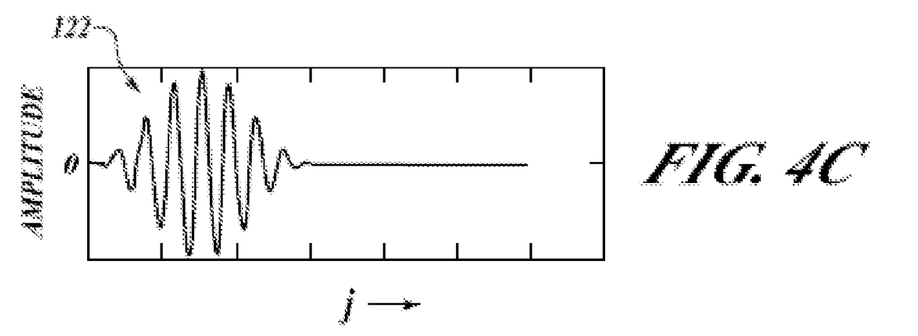

The time series 118 is filtered (or windowed), thereby resulting in a filtered time series 120 (FIG. 4B). Filtering advantageously damps down side lobes. Any filter function may be applied as desired, including without limitation a Kaiser-Bessel filter, a Chebycheff filter, a Hamming filter, or the like. In one embodiment, a Kaiser-Bessel filter is applied because a Kaiser Bessel allows the width to be tuned smoothly. The Kaiser-Bessel filter window may be implemented as a look-up table resident in storage (not shown) in the processor 20. Given by way of non-limiting example, the look-up-table may implement weighting coefficients for the Kaiser-Bessel filter function as 8-bit integers.

A zero-padded time series 122 (FIG. 4C) is created by adding sample points that are all zeroes onto the end of the time series 120 (FIG. 4B) (referred to as "zero padding"). The number of zero sample points may be the same as the number of sample points in the subsample that makes up the time series 120. Given by way of non-limiting example, 512 zero sample points may be added onto the end of the time series 120, thereby populating the time series 122 with 1,024 sample points. Zero padding the time series 120 to create the time series 122 increases resolution because the number of sample points is increased. In the non-limiting example illustrated herein, the time series 122 contains twice the number of sample points as does the time series 120.

Figure 4D:
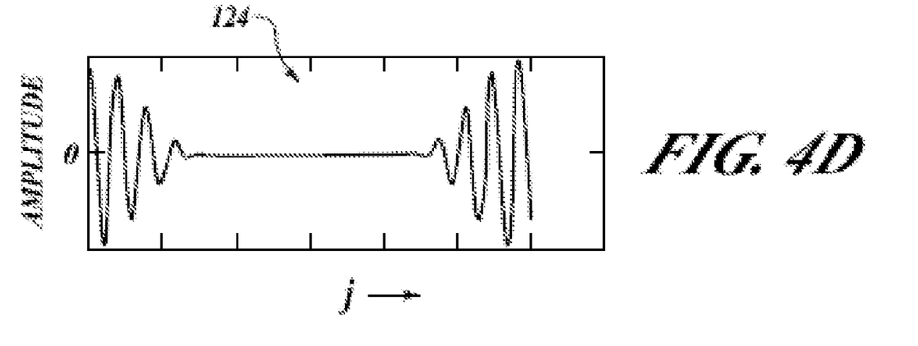

The zero-padded time series 122 is rotated by a predetermined amount, thereby resulting in a rotated time series 124 (FIG. 4D). Any amount of rotation may be used as desired for a particular application. Given by way of non-limiting example, the zero-padded time series 122 has been rotated by around twenty-five percent or so to create the rotated time series 124. It is noted that the middle of the function of the rotated time series 124 is at the ends of window. The data is rotated to determine the phase at the center of the subsample (where it has better noise characteristics). A Fourier transform evaluated for phase determines phase at the beginning of the time series being evaluated. Rotating the data puts the middle of the time series and the point at which the phase is being measured at the same spot—that is, the beginning of the time series. Putting the phase at the center of the time series reduces noise because there is less variation over a set of identical samples than measurements made at either the beginning or the end of the time series.

Referring back to FIG. 3, at a block 126 a Fourier transform is performed on the rotated time series 124 (FIG. 4D). The Fourier transform may be implemented as a fast Fourier transform (FFT) in a known manner. It will be noted again that the original interference signal has been sampled in overlapping subsamples—such as, for example, the forty-three overlapping subsamples 114a–114aq.

Figure 5A:
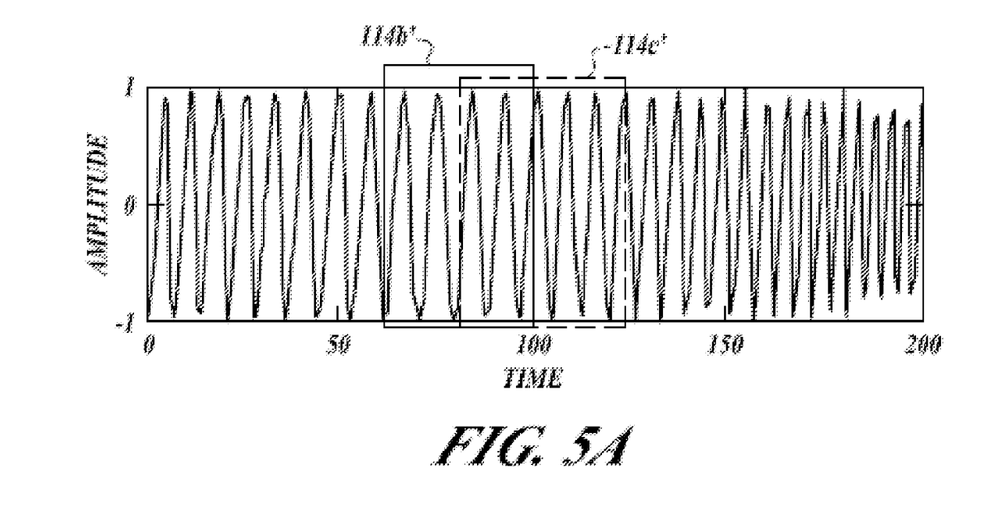
FIGS. 5A and 5B are illustrations of an exemplary time series interval and its Fourier transform.
Figure 5B:
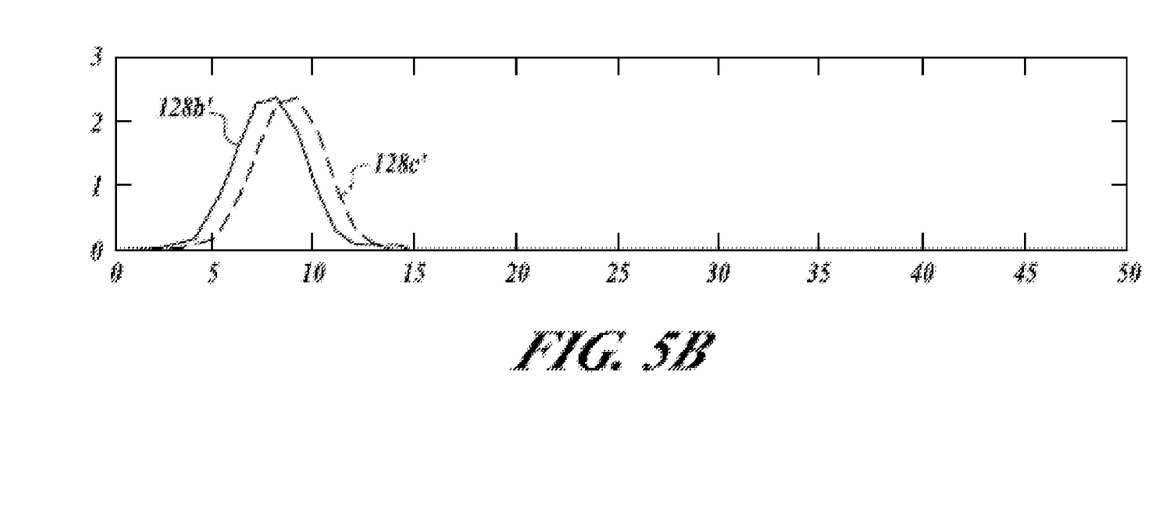

For example, referring additionally to FIGS. 5A and 5B, a subinterval 114b' is a graphical illustration of interference signal amplitude versus time that is sampled in the 512 samples of the subsample 114b (FIG. 3). A subinterval 114c', that overlaps the subinterval 114b', is a graphical illustration of interference signal amplitude versus time that is sampled in the 512 samples of the subsample 114c (FIG. 3). A graph 128b' illustrates a Fourier transform of the rotated time series 124 derived from the subinterval 114b' and a graph 128c' illustrates a Fourier transform of the rotated time series 124 derived from the subinterval 114c'.

Because the Fourier transform is performed on each rotated time series 124, and each rotated time series 124 represents only one subsample, the Fourier transform is performed on only a subinterval of the original time-sampled interference signal. Performing the Fourier transform on the subinterval advantageously results in a Fourier transform peak that is significantly narrower than broad Fourier transform peaks performed on entire intervals of signals as known in the prior art. This subinterval Fourier transform processing advantageously results in more accurate determinations of phase and/or frequency than processing of entire signal intervals according to the prior art.

The Fourier transform may be performed as an FFT in any acceptable manner as desired for a particular application. Imaginary values are input as zeroes. Given by way of non-limiting example, the FFT may use 1024 floating point input values with 64-bit floating point arithmetic. As a further example, the FFT may use 512 20-bit integer input values with 32-bit fixed point arithmetic.

Referring back to FIG. 3, at a block 130 phase at peak frequency is computed. From the Fourier transform, phase at the center of the subinterval is obtained using peak finding and phase interpolation methods. In one presently preferred embodiment, the approach for determining phase is as follows. Given real and imaginary FFT results R(x) and I(x), power is computed:

$$P(x)=R(x)*R(x)+I(x)*I(x) \quad (1)$$

Indices of two highest local maxima values are found where indices are each greater than 14 and differing by at least 14 in magnitude (the preceding values of 14 are replaced with 5 for signals from reference channels 44b and 44c). At each index, peak frequency and fractional phase are computed. Finally, total phase is computed.

Peak frequency is computed as follows. Given power P(x) and a local maximum index i, peak frequency is computed from a parabolic fit of power on either side of the index i:

$$dP(i+1)=P(i+1)-P(i) \quad (2)$$

$$dP(i-1)=P(i-1)-P(i) \quad (3)$$

$$f=i-(dP(i+1)-dP(i-1))/(dP(i+1)+dP(i-1))/2 \quad (4)$$

Fractional phase is computed as follows. Given real and imaginary FFT results R(x) and I(x) and given peak frequency f, fractional phase is computed via linear interpolation:

$$j=\text{Floor}(f) \text{ and } k=\text{Ceil}(f) \quad (5)$$

$$R\$=R(j)+(R(k)-R(j))*(f-j) \quad (6)$$

$$I\$=I(j)+(I(k)-I(j))*(f-j) \quad (7)$$

$$\Phi=-\arctan 2(I\$,R\$)/2\pi \quad (8)$$

Combined values for frequency and phase are next computed, and then total phase is computed. Given peak frequencies $f_1$ and $f_2$, associated with the two local maxima previously determined, and given corresponding fractional phases $\Phi_1$ and $\Phi_2$, combined frequency and phase are computed:

$$f=f_1+f_2 \text{ (units are cycles/transform)} \quad (9)$$

$$\Phi=\Phi_1+\Phi_2 \text{ (units are cycles)} \quad (10)$$

Total phase is computed by adding integer cycles relative to phase from preceding subsample:

$$\emptyset=\Phi+\text{Round}(\emptyset\$-\Phi+(f\$+f)/2\alpha) \quad (11)$$

where
  f\$=combined frequency from preceding subsample;
  Ø\$=total phase from preceding subsample;
  initial value of f\$ and Ø\$ are zero; and
  α=transform size/step size (units are steps/transform).

Referring back to FIG. 3, at a block 132 average phase and average frequency is computed from the total phases that have been previously computed as described above by equations (1)–(11). Given total phases Ø(x) and where x=0 . . . n−1 (where n=number of subsamples), average phase is computed:

$$\emptyset=\Sigma\emptyset(x)/n \quad (12)$$

Figure 6:
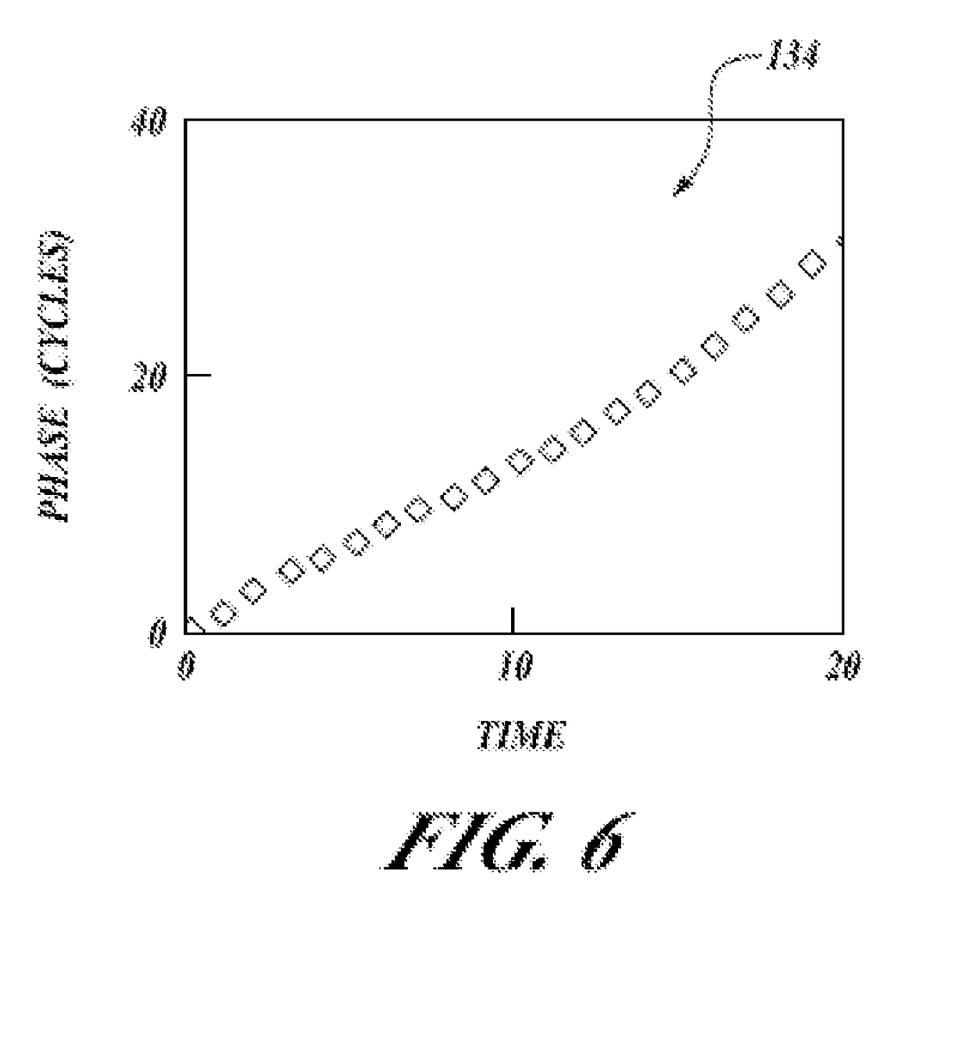
FIG. 6 is an illustration of an exemplary phase-versus-time plot derived from a time series.

Referring additionally to FIG. 6, a plot 134 of phase versus time has a slope with substantially little variation. As such, a linear fit through the phase data can be made and a frequency can be associated with the slope of the linear fit through the phase data. Average frequency for the signal channel interference signal and the reference interference signal from the first reference channel 44a is computed from slope of phase as follows.

$$\delta = \Sigma(\emptyset(x)*x) - \emptyset*\beta \text{ (units are arbitrary)} \quad (13)$$

where $\beta$ is a constant based on step size and n.

Average frequency is not computed for the second and third reference channels 44b and 44c because frequency is not used to estimate the integer phase for the reference channels. The integer phase is estimated from the known ratios of the lengths $l_1$, $l_2$, and $l_3$. It is only on the measured length to the target that the integer phase is estimated from the chirp frequencies.

The ratio R of average frequencies is computed as follows:

$$R = \delta_0/\delta_1 \text{ (unitless)} \quad (14)$$

Referring back to FIG. 2, in an exemplary embodiment range is computed at the block 112 using an iterative process as follows. Given average phases for the second and third reference channels 44b and 44c and given lengths of the second and third reference channels 44b and 44c, an estimate is made for synthetic wavelength $\lambda$. It will be noted that different values are used for up-chirp and down-chirp data— one of which will be negative.

A difference in average phases is used to make first refinement:

$$\emptyset_{23} = (\emptyset_2 - \emptyset_3) \quad (15)$$

$$\text{Length}_{23} = (\text{Length}_2 - \text{Length}_3) \quad (16)$$

$$\lambda' = \text{Length}_{23}/(\emptyset_{23} + \text{Round}(\text{Length}_{23}/\lambda - \emptyset_{23})) \quad (17)$$

Average phase for the third reference channel 44c is used to make a second refinement of synthetic wavelength:

$$\lambda'' = \text{Length}_3/(\emptyset_3 + \text{Round}(\text{Length}_3/\lambda' - \emptyset_3)) \quad (18)$$

Given average phases for the interference signal for the signal channel and for the reference interference signal for the first reference channel 44a, and given length of the first reference channel 44a, and given the ratio R of average frequencies, average phase for the first reference channel 44a is used to make a final refinement of synthetic wavelength:

$$\lambda\$ = \text{Length}_1/(\emptyset_1 + \text{Round}(\text{Length}_1/\lambda'' - \emptyset_1)) \quad (19)$$

The average phase for the signal channel and the ratio R of average frequencies are used to compute range:

$$\text{Range} = (\lambda\$*(\emptyset_0 + \text{Round}(\text{Length}_1*R/\lambda\$ - \emptyset_0)))/2 \quad (20)$$

However, it will be appreciated that a ratio of the phases is also directly proportional to a ratio of distance to the target and length of the first reference channel 44a.

In an alternate embodiment of a method of processing signals to determine the Range from the system 10 to the target 14, a different method of determining average phases and average frequencies, and thus computing Range using Equation 20, may be used. More specifically, in an alternate embodiment, an initial estimate is made of the synthetic wavenumber expressed in round trip, K0. This initial estimate is used to estimate the integer part of the phase of the shortest interferometer, which in one particular embodiment is the difference in length of the first two reference channels (e.g. ~20 mm in length). The round function may then be used to estimate the phase according to the following equation:

$$p23 = \text{round}(p23\text{exp} - p23\text{meas}) + p23\text{meas} \quad (21)$$

The length of the difference is L23, and p23exp=K0*L23 is the estimated phase, p23 is the calculated phase, and p23meas is the phase measurement from the FFT process. Next, the phase of the next longer interferometer whose length is L3 and whose phase is p3 is calculated as follows:

$$p3 = \text{round}(p23\text{meas}*L3/L23 - p3\text{meas}) + p3\text{meas} \quad (22)$$

Similarly, the longest reference phase p1 may be computed. In the estimate of the signal channel range L0, the chirp information may be used, including the frequency for the signal channel f0, and the frequency for the longest reference interferometer f1. The round trip range L0 of the signal channel is then estimated as follows:

$$L0 = (\text{round}(p1*f0/f1 - p0\text{meas}) + p0\text{meas})*L1 \quad (23)$$

where L1 is the length of the longest reference interferometer. This alternate signal processing procedure encodes the synthetic wavelength in the phase p1, similar to the signal processing procedure described above. Again, using the average phases for the interference signal for the signal channel, and for the reference interference signal for the first reference channel 44a, and given length of the first reference channel 44a, and given the ratio R of average frequencies, average phase for the first reference channel 44a is used to make a final refinement of synthetic wavelength. The average phase for the signal channel and the ratio R of average frequencies are then also used to compute range using Equation 20 above.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A system for determining a distance to a target, comprising:

a laser source adapted to provide a first laser output and a second laser output;

a controller operatively coupled to the laser source and adapted to frequency-modulate the first and second laser outputs;

an optical assembly adapted to receive and combine at least part of the first and second laser outputs into a combined laser output, the optical assembly including:

a plurality of reference channels adapted to receive a portion of the combined laser output and to provide a plurality of reference interference signals; and a signal channel having a focusing telescope adapted to focus and transmit at least part of the combined laser output onto the target, and to receive a scattered signal from target, and to provide a return interference signal;

a signal processing portion adapted to receive the plurality of reference interference signals and the return interference signal and to determine the distance to the target based on the plurality of reference interferences signals and the return interference signal.

2. The system of claim 1, wherein each reference interference signal is based on a plurality of natural Fresnel reflections, and wherein the return interference signal is based on at least one natural Fresnel reflection.

3. The system of claim 1, wherein the optical assembly includes an optical component adapted to reflect a first portion of the combined laser output back along the optical component, and to transmit a second portion of the combined laser output to the focusing telescope, the return interference signal being formed by the reflected first portion and the scattered signal received from the target.

4. The system of claim 3, wherein the optical component comprises an optical fiber having an operating end adapted to reflect the first portion and to transmit the second portion.

5. The system of claim 3, wherein the second portion is divergingly transmitted by the optical component, and wherein the focusing telescope is adapted to receive the diverging second portion and to focus the diverging second portion toward the target.

6. The system of claim 1, wherein the signal processing portion includes:
   a first component adapted to estimate a synthetic wave number;
   a second component adapted to estimate a phase for each of the plurality of reference channels;
   a third component adapted to estimate a phase for the signal channel; and
   a fourth component adapted to estimate a range based on the estimates of phase and synthetic wave number.

7. The system of claim 6, wherein the signal processing portion further includes:
   a fifth component adapted to make a refinement of the synthetic wave number using the estimates of phase, a length of at least one of the reference channels, and a ratio of average frequencies of the first and second laser outputs.

8. The system of claim 6, wherein the first component is adapted to estimate a synthetic wave number expressed in round trip.

9. The system of claim 6, wherein the second component is adapted to estimate a phase for a first one of the reference channels as round(p23exp−p23meas)+p23meas, wherein p23exp is the product of the synthetic wave number times a length of the reference channel, and p23meas is the measurement from the fast Fourier transform process.

10. The system of claim 6, wherein the p23exp is the product of the synthetic wave number times a length of the reference channel.

11. The system of claim 1, wherein the signal processing portion includes:
   a first component adapted to sample the return signal over a finite period of time at a plurality of subintervals;
   a second component adapted to pre-process the plurality of sampled subinterval signals;
   a third component adapted to perform a Fourier transform on the plurality of pre-processed sampled subinterval signals;
   a fourth component adapted to extract phases of the plurality of pre-processed sampled subinterval signals from the Fourier transform; and
   a fifth component adapted to determine a parameter indicative of frequency of the sinusoidal signal from slope of the phases of the plurality of pre-processed sampled subinterval signals.

12. A system for determining distance to a target, comprising:
   a source adapted to provide at least two laser beams having a relative frequency separation;
   a frequency modulator operatively coupled to the source and adapted to modulate the frequencies of the two laser beams;
   an optical assembly adapted to receive and combine the two laser beams, the optical assembly including:
      a reference interferometer configured to generate a plurality of reference interference signals;
      a signal channel having a focusing telescope adapted to focus and transmit at least part of the combined laser output onto the target, and to receive a return signal from target, and
      a detector configured to detect a return interference signal created by mixing the return signal from the target with a portion of the combined laser beams; and
   a signal processing portion adapted to receive the plurality of reference interference signals and the return interference signal and to determine the distance to the target based on the plurality of reference interference signals and the return interference signal.

13. The system of claim 12, wherein each reference interference signal is based on a plurality of natural Fresnel reflections, and wherein the return interference signal is based on at least one natural Fresnel reflection.

14. The system of claim 12, wherein the signal channel includes an optical component adapted to reflect a first portion of the combined laser output back along the optical component, and to transmit a second portion of the combined laser output to the focusing telescope, the return interference signal being formed by the reflected first portion and the return signal received from the target.

15. The system of claim 14, wherein the optical component comprises an optical fiber having an operating end adapted to reflect the first portion and to transmit the second portion.

16. The system of claim 14, wherein the second portion is divergingly transmitted by the optical component, and wherein the focusing telescope is adapted to receive the diverging second portion and to focus the diverging second portion toward the target.

17. The system of claim 12, wherein the signal processing portion includes:
   a first component adapted to estimate a synthetic wave number;
   a second component adapted to estimate a phase for each of the plurality of reference channels;
   a third component adapted to estimate a phase for the signal channel; and
   a fourth component adapted to estimate a range based on the estimates of phase and synthetic wave number.

18. The system of claim 17, wherein the signal processing portion further includes: a fifth component adapted to make a refinement of the synthetic wave number using the estimates of phase, a length of at least one of the reference channels, and a ratio of average frequencies of the first and second laser outputs.

19. The system of claim 17, wherein the first component is adapted to estimate a synthetic wave number expressed in round trip.

20. The system of claim 17, wherein the second component is adapted to estimate a phase for a first one of the reference channels as round(p23exp−p23meas)+p23meas, and wherein the p23exp is the product of the synthetic wave number times a length of the reference channel.

21. A method for determining a distance to a target, comprising:

frequency modulating two laser beams having a relative frequency separation;

combining the two frequency-modulated laser beams into a combined beam;

projecting the combined beam onto a target, including focusing the combined beam using an output telescope;

creating a return interference signal by mixing a scattered signal from the target with a portion of the combined beam;

generating a plurality of reference interference signals; and determining the distance to the target based on the return interference signal and the plurality of reference interference signals.

22. The method of claim 21, wherein projecting the combined beam onto a target includes projecting the combined beam through an optical component adapted to reflect a first portion of the combined laser output back along the optical component, and to transmit a second portion of the combined laser output to the focusing telescope, and wherein creating the return interference signal includes creating the return interference signal using the reflected first portion and the scattered signal received from the target.

23. The method of claim 22, wherein generating a plurality of reference interference signals includes generating a plurality of reference interference signals, each reference interference signal is based on a plurality of natural Fresnel reflections, and wherein creating a return interference signal includes creating a return interference signal wherein the return interference signal is based on at least one natural Fresnel reflection.

24. The method of claim 22, wherein projecting the combined beam includes divergingly transmitting the second portion from the optical component to the focusing telescope, receiving the diverging second portion into the focusing telescope, and focusing the diverging second portion toward the target.

25. The method of claim 21, wherein determining the distance to the target includes: estimating a synthetic wave number;

estimating a reference phase for the at least one reference channel;

estimating a return phase for the return interference signal; and estimating the distance based on the estimates of reference phase, return phase, and synthetic wave number.

* * * * *